United States Patent
Galinkin

(10) Patent No.: US 11,973,792 B1
(45) Date of Patent: Apr. 30, 2024

(54) GENERATING VULNERABILITY CHECK INFORMATION FOR PERFORMING VULNERABILITY ASSESSMENTS

(71) Applicant: Rapid7, Inc., Boston, MA (US)

(72) Inventor: Erick Galinkin, Monroe, NC (US)

(73) Assignee: Rapid7, Inc., Boston, MA (US)

( * ) Notice: Subject to any disclaimer, the term of this patent is extended or adjusted under 35 U.S.C. 154(b) by 269 days.

(21) Appl. No.: 17/667,629

(22) Filed: Feb. 9, 2022

(51) Int. Cl.
H04L 29/06 (2006.01)
H04L 9/40 (2022.01)

(52) U.S. Cl.
CPC .............................. *H04L 63/1433* (2013.01)

(58) Field of Classification Search
None
See application file for complete search history.

(56) References Cited

U.S. PATENT DOCUMENTS

| | | | |
|---|---|---|---|
| 10,855,717 B1* | 12/2020 | Feiman | G06F 21/57 |
| 2019/0258807 A1* | 8/2019 | DiMaggio | G06F 21/577 |
| 2021/0034753 A1* | 2/2021 | Canada | G06F 18/217 |
| 2021/0319313 A1* | 10/2021 | Warren | G06N 3/08 |

* cited by examiner

*Primary Examiner* — Bradley W Holder
(74) *Attorney, Agent, or Firm* — Ashwin Anand

(57) ABSTRACT

Various embodiments include systems and methods to implement a process for generating vulnerability check information for performing vulnerability assessments associated with security vulnerabilities. Vulnerability information corresponding to a security vulnerability is input into a multi-headed neural network. An extractive summary of the vulnerability information is output via a vulnerability check head of the multi-headed neural network. Synthetic scan results forming a set of positive examples are generated based at least in part on the extractive summary. An inductive logic programming system is implemented that uses the positive examples and predefined negative examples as inputs to determine, using a set covering algorithm, a general logic program that matches the positive examples and does not match the negative examples. Based at least in part on the general logic program, vulnerability check information is generated for performing a vulnerability assessment associated with the security vulnerability.

20 Claims, 9 Drawing Sheets

GENERATING VULNERABILITY CHECK INFORMATION FOR PERFORMING VULNERABILITY ASSESSMENTS

BACKGROUND

Many companies operate private computer networks that are connected to public networks such as the Internet. While such connections allow its users to easily access resources on the public networks, they also expose the company network to potential cyberattacks. For example, company users may unwittingly download malicious content (e.g., data, files, applications, programs, etc.) onto the company network from the Internet. As another example, interactions between company users and outsiders on the public network may result in leaks of proprietary information to allow malicious actors to gain unauthorized access to the company network. Different types of cyberattacks can be used to achieve a variety of different ends, for example, to obtain sensitive information, gain control of the company's computing systems, or damage the company's resources. As a result, enterprise security management systems have become increasingly important to protect private company networks against these types of vulnerabilities.

Vulnerability content may be derived from vendor advisories, the national vulnerability database (NVD), and sometimes other sources. Parsing these sources is difficult since there is a significant amount of volatility in those data sources. As such, keying off of hypertext markup language (HTML) and cascading style sheet (CSS) tags may require significant maintenance of parsers. This may consume large amounts of time for developers who could otherwise be working on reducing technical debt or adding features.

SUMMARY OF EMBODIMENTS

According to some embodiments, the systems and methods described herein may be employed in various combinations and embodiments to implement processing of web content for vulnerability assessments. According to some embodiments, the systems and methods described herein may be employed in various combinations and embodiments to implement a process for determining expected exploitability of security vulnerabilities. According to some embodiments, the systems and methods described herein may be employed in various combinations and embodiments to implement a process for generating vulnerability check information for performing vulnerability assessments associated with security vulnerabilities.

Figure 1:
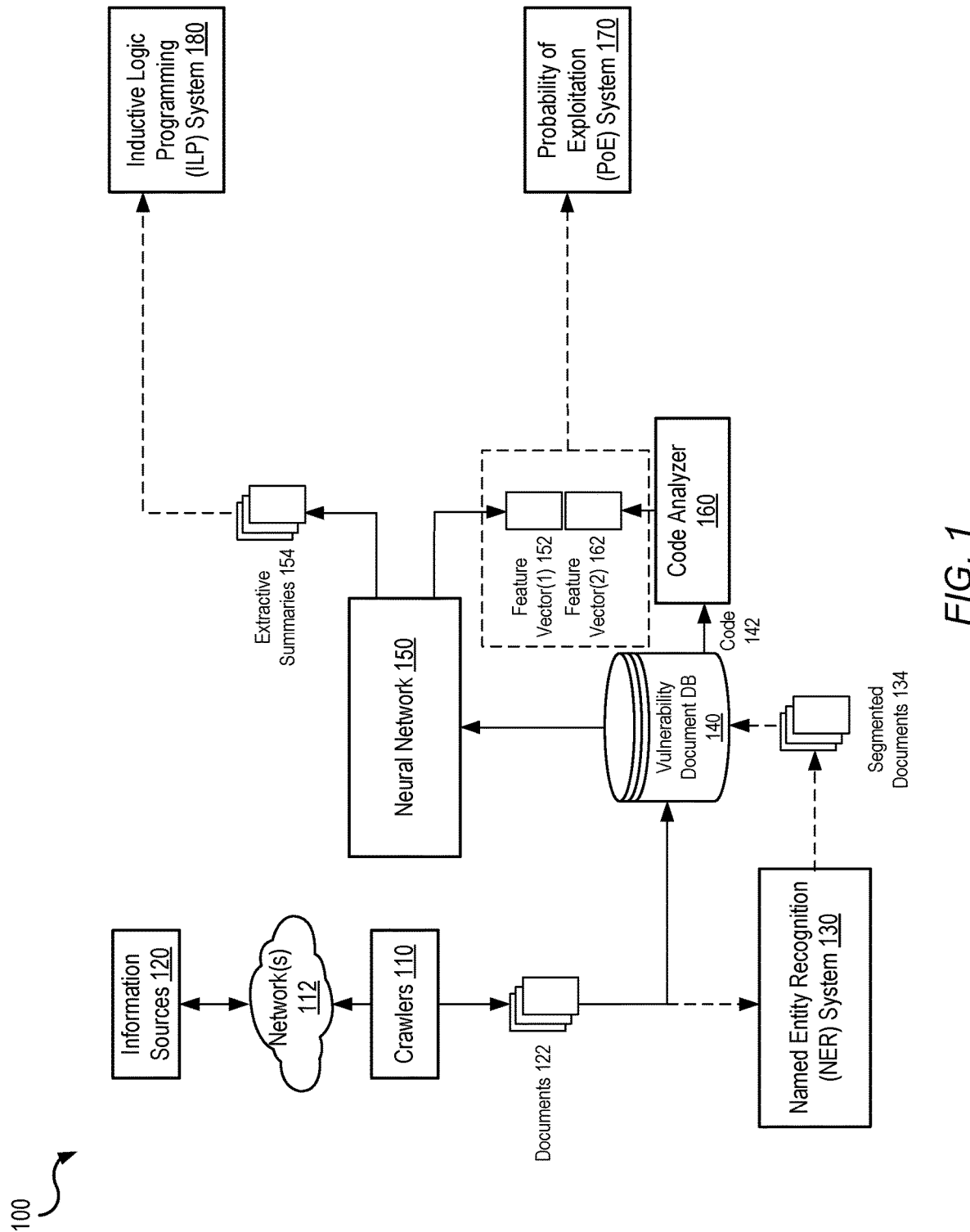
FIG. 1 is a block diagram illustrating an example system that implements operations in accordance with various embodiments of the present disclosure.

While embodiments are described herein by way of example for several embodiments and illustrative drawings, those skilled in the art will recognize that embodiments are not limited to the embodiments or drawings described. It should be understood that the drawings and detailed description thereto are not intended to limit embodiments to the particular form disclosed, but on the contrary, the intention is to cover all modifications, equivalents and alternatives falling within the spirit and scope as defined by the appended claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION OF EMBODIMENTS

The present disclosure describes systems and methods of processing web content to generate vulnerability checks. The present disclosure removes parsers in favor of a machine learning-based approach. From webpage content, multiple components of vulnerability content can be generated by a combination of natural language processing (NLP), inductive logic programming (ILP), and automation. This may enable the addition of data sources more easily and allow personnel to be significantly more efficient in their use of automation.

In the present disclosure, the system may ingest content from the web, parse the documents to divide them into discrete chunks, and then ingest them into a transformer machine learning model. This model may output a solution and context, which informs what vulnerable and non-vulnerable systems look like. Synthetic scan results may be generated, and an inductive logic programming (ILP) system may utilize a set of covering algorithms to find a rule that covers the vulnerable systems but excludes the non-vulnerable systems. This rule may then be converted to extensible markup language (XML) to be utilized by a vulnerability management system.

Thus, according to some aspects, the systems and methods of the present disclosure may utilize a combination of natural language processing to inform an inductive logic programming system. According to some aspects, the systems and methods of the present disclosure may utilize a finely tuned tokenizer for a particular subject plus the application of attention with linear biases to the problem of extractive summarization across multiple documents.

As described herein, a process according to the present disclosure may begin with crawlers reaching out to a variety of sources (e.g., vendor pages, NVD, and other sources) and collecting HTML pages. According to some embodiments, if such pages are too long or are suspected to contain information about multiple vulnerabilities, then a named entity recognition (NER) system may label a given document and segment the given document based on a cluster of identified entities. That is, the NER system of the present disclosure may group the closest product, common vulnerabilities and exposures (CVE) identifier (CVE-ID), and description as a single document and then separate the document according to clusters of products, vulnerabilities, and descriptions. These are then tagged and submitted, along with the documents that were not segmented, to a database (also referred to herein as a "vulnerability document database") containing and indexing the vulnerability information.

The vulnerability document database of the present disclosure may be utilized by a neural network. According to various embodiments, the neural network of the present disclosure is a fine-tuned transformer model that utilizes a combination of a Longformer model with an Attention with Linear Biases (AliBi) technique to allow for extremely long input sequences. The tokenizer is customized to handle vulnerability and exploit-related vocabulary. For each vulnerability identifier, each of the relevant documents may be collected and concatenated together. Subsequently, the neural network may perform two functions with different network segments. A first head may perform a question answering (QA) task to generate an extractive summary of the documents. In particular, the QA task includes extracting pertinent information for constructing a content file (e.g., an XML file) and a vulnerability solutions file to be utilized by a vulnerability management system.

Using the extractive summary, the system may then generate synthetic scan results, simulating a vulnerability management scan. This set of simulated scan results may form a set of positive examples, which may be used alongside a predefined set of negative examples. A custom grammar may be defined with predicates that correspond to rules in a Java Expert System Shell (JESS) that orchestrates vulnerability checks performed by the vulnerability management system. An inductive logic programming (ILP) system may then utilize a set covering algorithm to identify a maximally general logic program to match positive scan results but not negative scan results. This may then be converted directly to a candidate vulnerability check. A validator may validate this candidate vulnerability check and, if the output is valid, the validator may generate a vulnerability check file based upon the scraped content without human intervention.

A second head of the neural network does not train the embedding weights and outputs a feature vector. An abstract syntax tree (AST) analyzer may examine code snippets from one or more sources that are suspected to be related to a given vulnerability and may assess code complexity and other factors to produce another feature vector. The two feature vectors may be concatenated together and provided to a regressive decision-tree model referred that estimates a probability of exploitation.

Reference will now be made in detail to embodiments, examples of which are illustrated in the accompanying drawings. In the following detailed description, numerous specific details are set forth in order to provide a thorough understanding of the present disclosure. However, it will be apparent to one of ordinary skill in the art that some embodiments may be practiced without these specific details. In other instances, well-known methods, procedures, and components have not been described in detail so as not to unnecessarily obscure aspects of the embodiments.

Referring to FIG. 1, a block diagram illustrates various components of an example system 100 that implements operations in accordance with various embodiments of the present disclosure. In FIG. 1, the system 100 may comprise one or more computing resources, which may include one or more hardware processors with associated memory (not shown, see e.g., FIG. 9). The computing resource(s) may be configured to implement various operations according to the present disclosure.

According to some embodiments, the system 100 of FIG. 1 may include one or more hardware processors with associated memory that implement a process for determining expected exploitability of security vulnerabilities, as described herein. According to some embodiments, the system 100 of FIG. 1 may include one or more hardware processors with associated memory that implement a process for determining expected exploitability of security vulnerabilities, as described herein. According to some embodiments, the system 100 of FIG. 1 may include one or more hardware processors with associated memory that implement a process for generating vulnerability check information for performing vulnerability assessments associated with security vulnerabilities, as described herein.

According to various embodiments, FIG. 1 illustrates that crawlers 110 may be configured to obtain, via one or more networks 112 (e.g., the Internet), web content (e.g., HTML pages) from various information sources 120. According to some embodiments, the information sources 120 may include vendor advisories, the national vulnerability database (NVD), reports by security researchers, information from an attacker knowledge base, and other sources. The crawlers 110 may be configured to retrieve source code (e.g., HMTL, CSS, JavaScript, etc.) from one or more of the information sources 120 and to generate a plurality of documents 122 comprising web content. The system 100 depicted in FIG. 1 removes parsers in favor of a machine learning-based approach. From webpage content retrieved from the information sources 120, multiple components of vulnerability content can be generated by a combination of natural language processing (NLP), inductive logic programming (ILP), and automation. This may enable the addition of data sources more easily and allow personnel to be significantly more efficient in their use of automation.

According to some embodiments, FIG. 1 illustrates that, in cases where a given document of the documents 122 is too long (i.e., too many characters, as further described herein) or is suspected to contain information about multiple vulnerabilities, then a named entity recognition (NER) system 130 may label the given document and segment the given document based on a cluster of identified entities. That is, the NER system 130 depicted in the example of FIG. 1 may be configured to group the closest product, CVE-ID, and description as a single document and then separate the document into segmented documents 134 according to clusters of products, vulnerabilities, and descriptions. These segmented documents 134 are then tagged and submitted, along with any of the documents 122 that were not segmented, to a vulnerability document database 140 containing and indexing the vulnerability information.

The named entity recognition operations performed by the NER system 130 depicted in FIG. 1 may correspond to various natural language processing (NLP) operations. As an example, the NER system 130 may perform a NLP operation to examine a given document for named entities that may be relevant to security (e.g., CVE-ID, product name, exploitation technique, etc.). For a given document, the NER system 130 may assign labels within the given document to identify named entities. As an illustrative example, the NER system 130 may examine a given document and identify a first named entity (e.g., a product name) within the given document. The NER system 130 may continue to examine the given document to identify at least a second named entity (e.g., a CVE-ID). The NER system 130 may continue to examine the given document until identifying a different token which is the same type as the first token (e.g., product name in this example). The NER system 130 may cut/segment the given document into smaller documents at this example segmentation point to generate the segmented documents 134. This process may be used iteratively to ensure that each document stored in the vulnerability document database 140 contains a single vulnerability (which may be tagged with a vulnerability identifier, with a product name, or with other available information).

According to various embodiments, FIG. 1 illustrates that the vulnerability document database 140 may be utilized by a neural network 150. The neural network 150 may correspond to a fine-tuned transformer model that utilizes a combination of a Longformer model with an Attention with Linear Biases (ALiBi) technique to allow for extremely long input sequences. Both the Longformer model and the ALiBi technique represent approaches to handling long sequences that, when combined, may yield a more satisfactory result.

The tokenizer is customized to handle vulnerability and exploit-related vocabulary. For each vulnerability identifier, each of the relevant documents may be collected and concatenated together. Subsequently, the neural network 150 may perform two functions with different network segments, as illustrated and described further herein with respect to FIG. 2. With respect to the neural network 150, a first head may perform a question answering (QA) task to generate extractive summaries 154 of the documents (stored at the vulnerability document database 140). A second head of the neural network 150 may perform a probability of exploitation (PoE) task to output a first feature vector 152.

FIG. 1 illustrates that the system 100 may include a code analyzer 160 configured to receive code 142 from the vulnerability document database 140. According to some embodiments, the code analyzer 160 may correspond to an abstract syntax tree (AST) analyzer configured to examine code snippets from one or more sources that are suspected to be related to a given vulnerability and may assess code complexity and other factors to produce another feature vector, identified as a second feature vector 162 in FIG. 1. As illustrated and described further herein with respect to FIG. 2, the first feature vector 152 and the second feature vector 162 may be concatenated together and provided to a PoE system 170, which may correspond to a regressive decision-tree model that estimates a probability of exploitation. FIG. 1 further illustrates that information from the extractive summaries 154 that are output by the first head of the neural network 150 may be utilized by an inductive logic programming (ILP) system 180, as described further herein.

Thus, FIG. 1 illustrates an example system that implements operations in accordance with various embodiments of the present disclosure. According to some embodiments, the system 100 of FIG. 1 may be configured to implement a process for determining expected exploitability of security vulnerabilities, as described herein. According to some embodiments, the system 100 of FIG. 1 may be configured to implement a process for determining expected exploitability of security vulnerabilities, as described herein. According to some embodiments, the system 100 of FIG. 1 may be configured to implement a process for generating vulnerability check information for performing vulnerability assessments associated with security vulnerabilities, as described herein.

Figure 2:
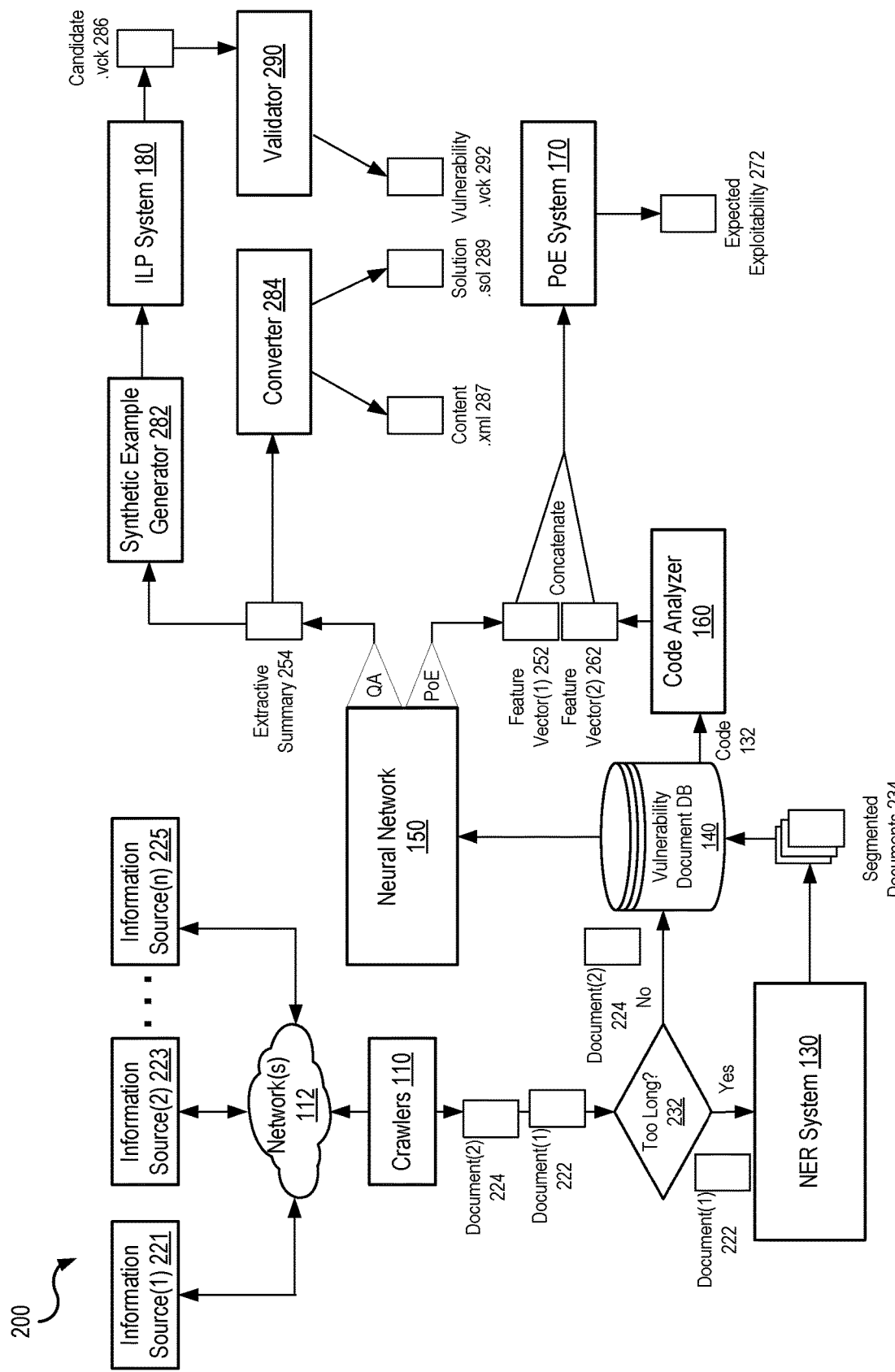
FIG. 2 is a block diagram illustrating an example system that implements operations in accordance with various embodiments of the present disclosure.

Referring to FIG. 2, a block diagram illustrates various components of an example system 200 that implements operations in accordance with various embodiments of the present disclosure. In FIG. 2, the system 200 may comprise one or more computing resources, which may include one or more hardware processors with associated memory (not shown, see e.g., FIG. 9). The computing resource(s) may be configured to implement various operations according to the present disclosure.

According to some embodiments, the system 200 of FIG. 2 may include one or more hardware processors with associated memory that implement a process for determining expected exploitability of security vulnerabilities, as described herein. According to some embodiments, the system 200 of FIG. 2 may include one or more hardware processors with associated memory that implement a process for determining expected exploitability of security vulnerabilities, as described herein. According to some embodiments, the system 200 of FIG. 1 may include one or more hardware processors with associated memory that implement a process for generating vulnerability check information for performing vulnerability assessments associated with security vulnerabilities, as described herein.

FIG. 2 illustrates that, according to some embodiments, the information sources 120 depicted in FIG. 1 may correspond to at least a first information source 221 and a second information source 223, up to an nth information source 225. For example, the first information source 221 may correspond to a first HTML page associated with vendor advisories from a particular vendor. The second information source 223 may correspond to a second HTML page associated with reports by particular security researchers. The nth information source 225 may correspond to the NVD, vendor advisories from other vendor(s), reports by other security researcher(s), attacker knowledge base(s), among other sources.

FIG. 2 depicts an example in which the crawlers 110 retrieve source code (e.g., HMTL, CSS, JavaScript, etc.) from at least the first information source 221 and the second information source 223 and generate a plurality of documents comprising web content, including at least a first document 222 and a second document 222. FIG. 2 illustrates, at decision box 232, that a determination may be made regarding whether a particular document is too long (i.e., too many characters). In the example depicted in FIG. 2, the first document 222 is determined to be too long and is processed by the NER system 130. By contrast, the second document 224 is determined to be of satisfactory length and is stored at the vulnerability document database 140.

According to various embodiments, the NER system 130 may be configured to perform NER-driven document segmentation on a given document (e.g., the first document 222 in the example depicted in FIG. 2). The NER system 130 depicted in FIG. 2 may correspond to a transformer-based NER system. Using the transformer-based NER system, entities are defined as those vulnerability-information-containing-documents having: a vulnerability identifier (CVE-ID); product name; and affected product. In some cases, a given document (e.g., the first document 222) may have multiple descriptions. In such cases, the aforementioned categories may be leveraged to segment the given document (e.g., the first document 222) into segmented documents 234 according to the following procedure.

According to various embodiments, the segmentation procedure may include scanning the given document (e.g., the first document 222) until a relevant named entity (e.g., a "triggering entity") from the list is identified. When a first named entity is identified, a series of operations may be performed. The operations may include scanning the given document (e.g., the first document 222) until at least one of the remaining two entities is identified. The operations may include continuing to scan the given document (e.g., the first document 222) until another entity of the same type as the triggering entity (e.g., a "stopping entity") is observed. The operations may include generating a file tagged with a vulnerability identifier, where the file includes content from the beginning of the given document (e.g., the first document 222) until the character preceding the stopping entity. The operations may include removing the identified portion of the document from the source document (e.g., the first document 222). According to various embodiments, the segmentation procedure may continue segmenting the source document according to the aforementioned operations until the end of the document is reached.

According to various embodiments, FIG. 2 illustrates that the vulnerability document database 140 may be utilized by the neural network 150. The tokenizer is customized to handle vulnerability and exploit-related vocabulary. For each vulnerability identifier, each of the relevant documents may be collected and concatenated together. Subsequently, the neural network 150 may perform two functions with different network segments. As illustrated in the example of FIG. 2, a first head of the neural network 150 may perform a QA task to generate an extractive summary 154 of the document(s) stored at the vulnerability document database 140 (e.g., the segmented documents 234 and/or the second document 224). As illustrated in the example of FIG. 2, a second head of the neural network 150 may perform a PoE task to output a first feature vector 152.

Referring to the first head of the neural network 150 which performs the QA task, the extractive summary 154 may correspond to a series of questions and answers. FIG. 2 illustrates that the extractive summary 154 may be provided to both a synthetic example generator 282 and a converter 284. The converter 284 may be configured to output a content file 287 (e.g., a content.xml file) and a solution file 289 (e.g., a solution.sol file) based on information in the extractive summary 154. For example, the questions and answers in the extractive summary 154 correspond to specific fields in the content file 287 containing certain required fields (e.g., name, description, product). Similarly, the solution file 289 corresponds to a plain text string that can be displayed such that when a customer receives an alert (a positive detection), a particular solution is displayed (e.g., instructions regarding how to address this vulnerability). Thus, the converter 284 depicted in FIG. 2 maps the question from the extractive summary 254 to the appropriate field in the content file 287 or the solution file 289 (because the extractive summary 254 is just a flat file). That is, the flat file can be parsed to get the appropriate field values.

FIG. 2 illustrates that the synthetic example generator 282 may be configured to generate synthetic scan results based on the vulnerable condition and the solution contained within the extractive summary 254. The synthetic scan results generated by the synthetic example generator 282 may resemble those returned by a vulnerability management system scanner but may have the values of the relevant software replaced by vulnerable conditions for positive examples and by patched conditions for negative examples.

The ILP system 180 depicted in FIG. 2 then uses an inductive logic programming (ILP) paradigm to generate logical clauses. Such logical clauses return true for each vulnerable example and return false for each negative example. The ILP system 180 includes predicate invention, which corresponds to a method for adding new high-level concepts to the model. This domain-specific application turns text summaries into logical programs that are converted into expert system rules without human tuning or intervention. The more positive and negative examples available, the faster the ILP system 180 may be able to generate a candidate vulnerability check file 286 (e.g., a .vck file) that matches all of the positive examples and none of the negative examples.

FIG. 2 illustrates that the candidate vulnerability check file 286 is provided to a validator 290, which may be configured to perform a syntax check to determine whether it is a rule that satisfies syntax requirements of a vulnerability assessment system. The output of the validator 290 is a vulnerability check file 292 (e.g., a .vck file). According to some embodiments, the content file 287, the solution file 289, and the vulnerability check file 292 are utilized by the vulnerability assessment system to check for a particular vulnerability.

With regard to the ILP system 180, an iterative process is used to detect all of the positive examples and none of the negative examples. For example, the ILP system 180 may generate a logic program based on multiple criteria, test to determine whether the logic program detects all of the positives and none of the negatives, and then constrain. If the logic program fails for some reason (e.g., some but not all of the positive examples were detected), then a more general hypothesis is appropriate. As another example, if the logic program detected all of the positive examples but also some of the negative examples, then a more specific hypothesis is appropriate. In summary, the ILP system 180 constrains the logic program iteratively by starting with a set of no constraints and appending different constraints upon examination.

Referring to the second head of the neural network 150 which performs the PoE task to output the first feature vector 252 based at least in part on the document(s) stored at the vulnerability document database 140 (e.g., the segmented documents 234 and/or the second document 224). The first feature vector 252 may be computed from a natural language processing (NLP) system that handles write-ups and mentions of vulnerability information. The PoE system 170 may correspond to a machine-learning algorithm that leverages two feature vectors that are concatenated together, identified as the first feature vector 252 and a second feature vector 262 in FIG. 2. The second feature vector 262 may be generated from a syntax tree representation of any available exploit code (identified as code 132 in FIGS. 1 and 2). Such code 132 is then analyzed by the code analyzer 160 (e.g., an abstract syntax tree (AST) analyzer) to determine features including: whether the program is correct; whether the code will run; and the complexity of the code. These features may be suggestive of whether or not a proof-of-concept is likely to be "weaponized" by a malicious actor.

Together, the two feature vectors 252, 262 are input to a regression model of the PoE system 170 that predicts a probability of exploitation (identified as an "expected exploitability" 272 in FIG. 2) for a given vulnerability. The PoE system 170 of FIG. 2 may correspond to a neural network that is a feed forward, Boggs standard, multi-layered perceptron. The PoE system 170 may be configured to output the expected exploitability 272, which may be represented as a number between zero and one that represents the probability that the particular vulnerability will be exploited "in the wild".

Thus, FIG. 2 illustrates an example system that implements operations in accordance with various embodiments of the present disclosure. According to some embodiments, the system 200 of FIG. 2 may be configured to implement a process for determining expected exploitability of security vulnerabilities, as described herein. According to some embodiments, the system 200 of FIG. 2 may be configured to implement a process for determining expected exploitability of security vulnerabilities, as described herein. According to some embodiments, the system 200 of FIG. 2 may be configured to implement a process for generating vulnerability check information for performing vulnerability assessments associated with security vulnerabilities, as described herein.

Figure 3:
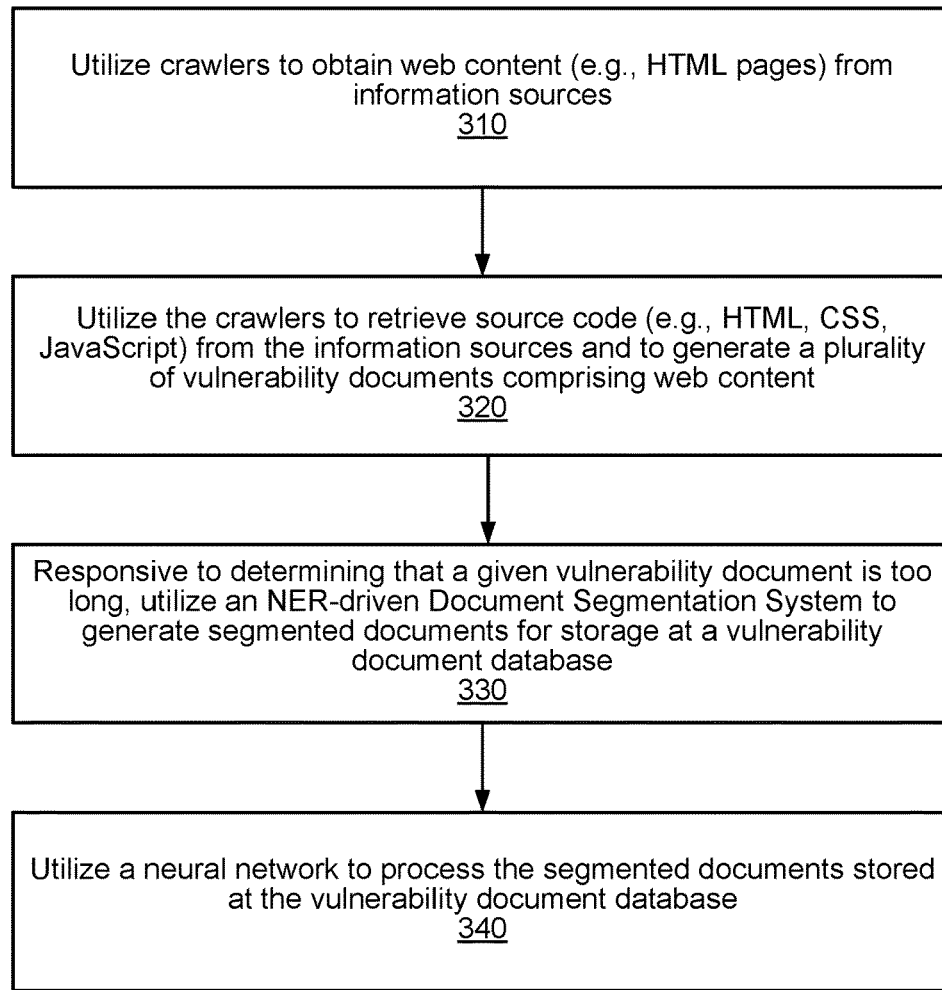
FIG. 3 is a flowchart that illustrates an example process of processing web content for vulnerability assessments, according to some embodiments.

FIG. 3 is a flowchart 300 that illustrates an example process of processing web content for vulnerability assessments, according to some embodiments. In FIG. 3, one or more hardware processors may be utilized to implement the operations described.

At operation 310, the process includes utilizing crawlers to obtain web content from information sources. For example, referring to FIG. 1, the crawlers 110 may be configured to obtain, via the network(s) 112, web content (e.g., HTML pages) from the various information sources 120. According to some embodiments, the information sources 120 may include vendor advisories, the national vulnerability database (NVD), reports by security researchers, information from an attacker knowledge base, and other sources. As another example, referring to FIG. 2, the crawlers 110 may be configured to obtain, via the network(s) 112, web content (e.g., HTML pages) from at least one of: the first information source 221; the second information source 223; up to the nth information source 225.

At operation 320, the process includes utilizing the crawlers to retrieve source code from the information sources and generating a plurality of vulnerability documents comprising web content. For example, referring to FIG. 1, the crawlers 110 may be configured to retrieve source code (e.g., HMTL, CSS, JavaScript, etc.) from the information sources 120 and to generate a plurality of documents 122 comprising web content. As another example, referring to FIG. 2, the crawlers 110 may be configured to retrieve source code from at least one of: the first information source 221; the second information source 223; up to the nth information source 225. Additionally, the crawlers 110 depicted in FIG. 2 may be configured to generate the first document 222 and the second document 224.

At operation 330, the process includes, responsive to determining that a given vulnerability document is too long, utilizing an NER-driven document segmentation system to generate segmented documents for storage at a vulnerability document database. For example, referring to FIG. 1, the NER system 130 may be configured to generate the segmented documents 134 for storage at the vulnerability document database 140. As another example, referring to FIG. 2, responsive to determining that the first document 222 is too long, the NER system 130 may be configured to generate the segmented documents 234 for storage at the vulnerability document database 140.

At operation 340, the process includes utilizing a neural network to process the segmented documents stored at the vulnerability document database. For example, referring to FIGS. 1 and 2, the neural network 150 may be utilized to process segmented documents stored at the vulnerability document database 140.

Thus, FIG. 3 illustrates an example of a process of processing of web content for vulnerability assessments.

Figure 4:
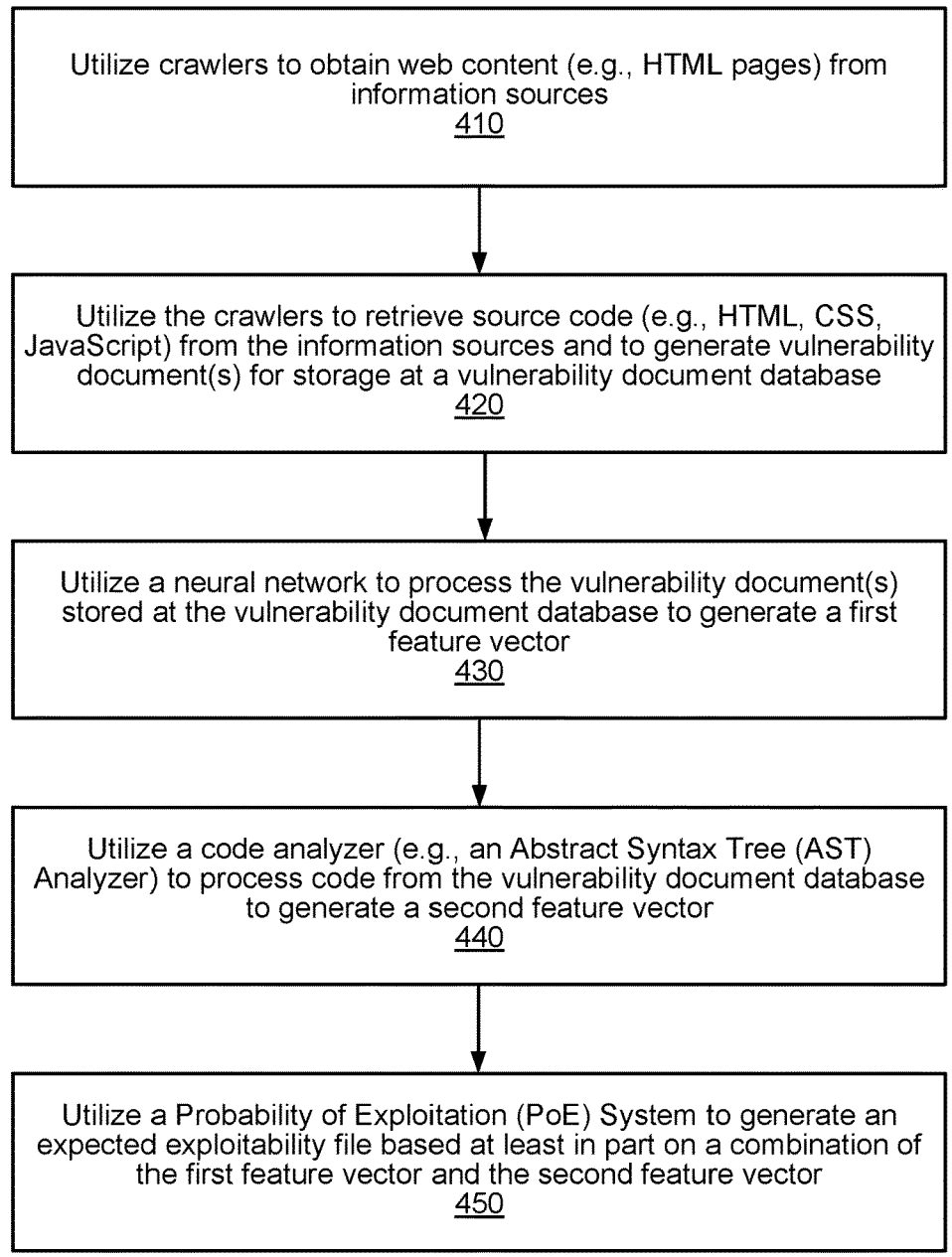
FIG. 4 is a flowchart that illustrates an example process of determining expected exploitability of security vulnerabilities, according to some embodiments.

FIG. 4 is a flowchart 400 that illustrates an example of a process of determining expected exploitability of security vulnerabilities, according to some embodiments. In FIG. 4, one or more hardware processors may be utilized to implement the operations described.

At operation 410, the process includes utilizing crawlers to obtain web content from information sources. For example, referring to FIG. 1, the crawlers 110 may be configured to obtain, via the network(s) 112, web content (e.g., HTML pages) from the various information sources 120. According to some embodiments, the information sources 120 may include vendor advisories, the national vulnerability database (NVD), reports by security researchers, information from an attacker knowledge base, and other sources. As another example, referring to FIG. 2, the crawlers 110 may be configured to obtain, via the network(s) 112, web content (e.g., HTML pages) from at least one of: the first information source 221; the second information source 223; up to the nth information source 225.

At operation 420, the process includes utilizing the crawlers to retrieve source code from the information sources and generating one or more vulnerability documents for storage at a vulnerability document database. For example, referring to FIG. 1, the crawlers 110 may be configured to retrieve source code (e.g., HMTL, CSS, JavaScript, etc.) from the information sources 120 and to generate a plurality of documents 122 for storage at the vulnerability document database 140. As another example, referring to FIG. 2, the crawlers 110 may be configured to retrieve source code from at least one of: the first information source 221; the second information source 223; up to the nth information source 225. Additionally, the crawlers 110 depicted in FIG. 2 may be configured to generate the first document 222 and the second document 224 for storage at the vulnerability document database 140.

At operation 430, the process includes utilizing a neural network to process the vulnerability document(s) stored at the vulnerability document database to generate a first feature vector. For example, referring to FIG. 2, the neural network 150 may be utilized to process the second document 224 and the segmented documents 234 stored at the vulnerability document database 140 to generate the first feature vector 252.

At operation 440, the process includes utilizing a code analyzer to process code from the vulnerability document database to generate a second feature vector. For example, referring to FIG. 2, the code analyzer 160 (which may correspond to an AST analyzer) may be utilized to process the code 132 from the vulnerability document database 140 to generate the second feature vector 262.

At operation 450, the process includes utilizing a PoE system to generate an expected exploitability file based at least in part on a combination of the first feature vector and the second feature vector. For example, referring to FIG. 2, the first feature vector 252 and the second feature vector 262 may be concatenated together and provided to the PoE system 170. The PoE system 170 of FIG. 2 may be configured to generate the expected exploitability 272 based at least in part on the combination of the first feature vector 252 and the second feature vector 262.

Thus, FIG. 4 illustrates an example of a process of determining expected exploitability of security vulnerabilities.

Figure 5:
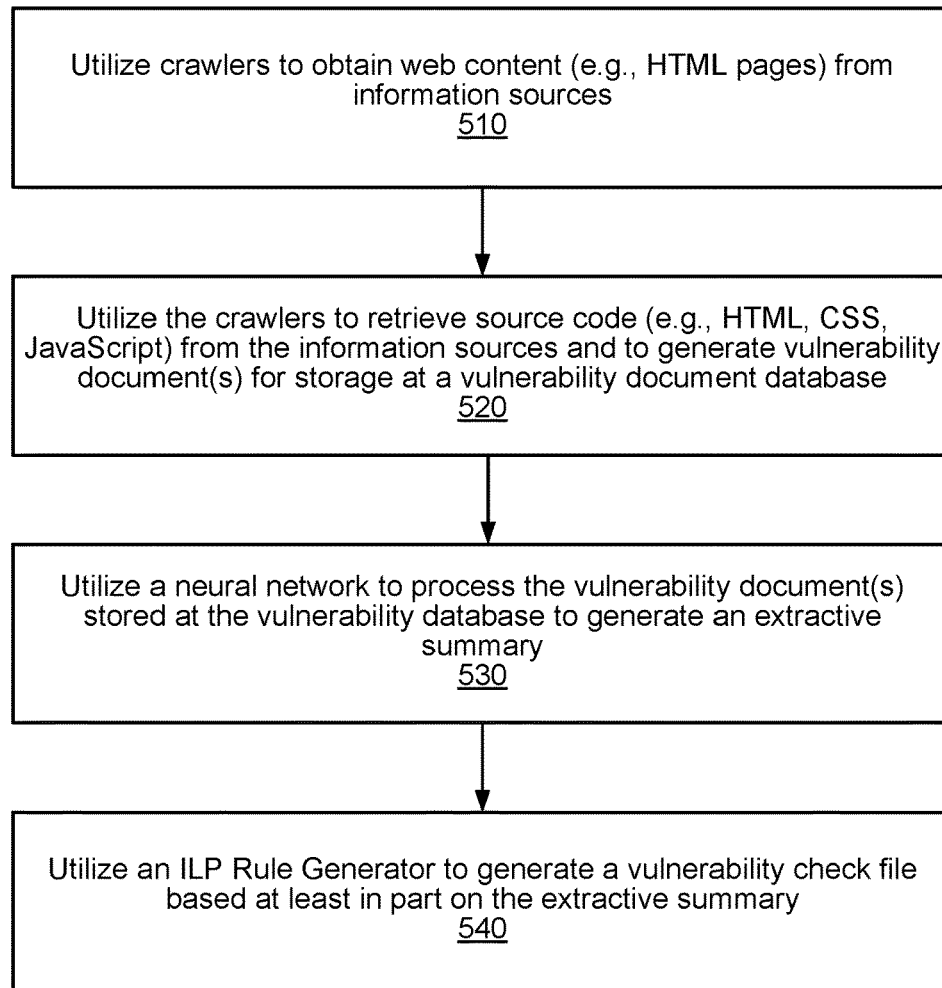
FIG. 5 is a flowchart that illustrates an example process of generating vulnerability check information for performing vulnerability assessments associated with security vulnerabilities, according to some embodiments.

FIG. 5 is a flowchart 500 that illustrates an example of a process of generating vulnerability check information for performing vulnerability assessments associated with security vulnerabilities, according to some embodiments. In FIG. 5, one or more hardware processors may be utilized to implement the operations described.

At operation 510, the process includes utilizing crawlers to obtain web content from information sources. For example, referring to FIG. 1, the crawlers 110 may be configured to obtain, via the network(s) 112, web content (e.g., HTML pages) from the various information sources 120. According to some embodiments, the information sources 120 may include vendor advisories, the national vulnerability database (NVD), reports by security researchers, information from an attacker knowledge base, and other sources. As another example, referring to FIG. 2, the crawlers 110 may be configured to obtain, via the network(s) 112, web content (e.g., HTML pages) from at least one of: the first information source 221; the second information source 223; up to the nth information source 225.

At operation 520, the process includes utilizing the crawlers to retrieve source code from the information sources and generating one or more vulnerability documents for storage at a vulnerability document database. For example, referring to FIG. 1, the crawlers 110 may be configured to retrieve source code (e.g., HMTL, CSS, JavaScript, etc.) from the information sources 120 and to generate a plurality of documents 122 for storage at the vulnerability document database 140. As another example, referring to FIG. 2, the crawlers 110 may be configured to retrieve source code from at least one of: the first information source 221; the second information source 223; up to the nth information source 225. Additionally, the crawlers 110 depicted in FIG. 2 may be configured to generate the first document 222 and the second document 224 for storage at the vulnerability document database 140.

At operation 530, the process includes utilizing a neural network to process the vulnerability document(s) stored at the vulnerability document database to generate an extractive summary. For example, referring to FIG. 1, the neural network 150 may be utilized to process the plurality of documents 122 stored at the vulnerability document database 140 to generate the extractive summaries 154. As another example, referring to FIG. 2, the neural network 150 may be utilized to process the second document 224 and the segmented documents 234 stored at the vulnerability document database 140 to generate the extractive summary 254.

At operation 540, the process includes utilizing an ILP Rule Generator to generate a vulnerability check file based at least in part on the extractive summary. For example, referring to FIG. 2, the ILP system 180 may be configured to generate the vulnerability check file 292 based at least in part on the extractive summary 254.

Thus, FIG. 5 illustrates an example of a process of generating vulnerability check information for performing vulnerability assessments associated with security vulnerabilities.

Figure 6:
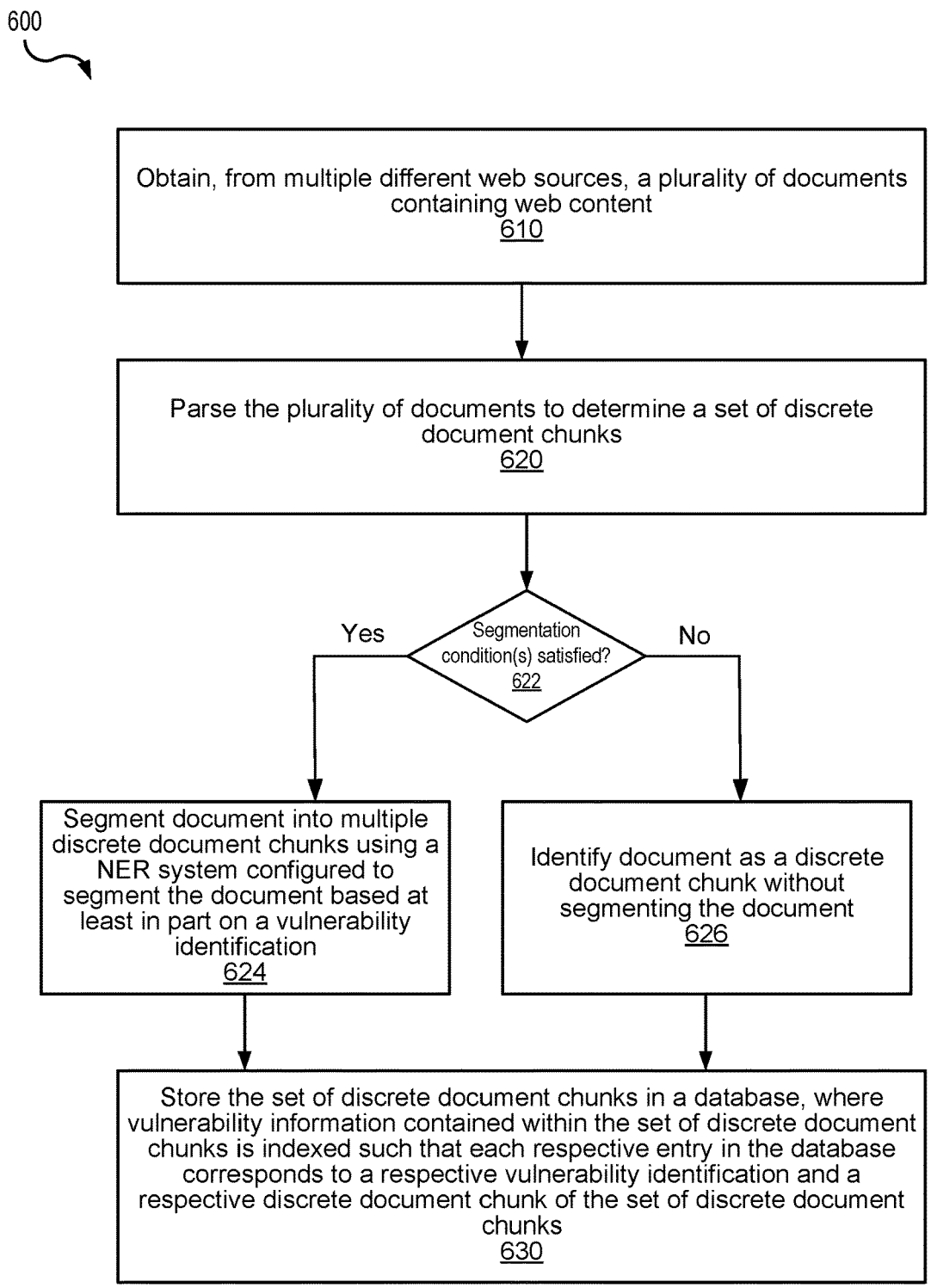
FIG. 6 is a flowchart that illustrates an example process of processing of web content for vulnerability assessments, according to some embodiments.

FIG. 6 is a flowchart 600 that illustrates an example of processing of web content for vulnerability assessments, according to some embodiments. In FIG. 6, one or more hardware processors may be utilized to implement the operations described.

At operation 610, the process includes obtaining, from multiple different web sources, a plurality of documents containing web content. For example, referring to FIG. 1, the crawlers 110 may be configured to obtain, via the network(s) 112, the plurality of documents 122 containing web content (e.g., HTML pages) from the various information sources 120. According to some embodiments, the information sources 120 may include vendor advisories, the NVD, reports by security researchers, information from an attacker knowledge base, and other sources. As another example, referring to FIG. 2, the crawlers 110 may be configured to obtain, via the network(s) 112, the first document 222 and the second document 223 containing web content (e.g., HTML pages) from at least one of: the first information source 221; the second information source 223; up to the nth information source 225.

At operation 620, the process includes parsing the plurality of documents to determine a set of discrete document chunks. For example, referring to FIG. 1, each document of the plurality of documents 122 may be parsed to determine a set of discrete document chunks. As another example, referring to FIG. 2, each of the first document 222 and the second document 224 may be parsed to determine a set of discrete document chunks.

FIG. 6 illustrates that, to parse the plurality of documents, the process includes determining whether a given document of the plurality of documents satisfies at least one segmentation condition, at operation 622. For example, referring to FIG. 2 a determination may be made whether the first document 222 and/or the second document 224 satisfies at least one segmentation condition.

Responsive to a determination that the given document satisfies the at least one segmentation condition, FIG. 6 illustrates that the process may proceed to operation 624. Responsive to a determination that the given document does not satisfy the at least one segmentation condition, FIG. 6 illustrates that the process may proceed to operation 626.

At operation 624, the process may include segmenting the given document into multiple discrete document chunks using a NER system configured to segment the given document based at least in part on a vulnerability identification (ID). For example, referring to FIG. 2, at decision box 232, a determination may be made that the first document 222 satisfies at least one segmentation condition (e.g., the first document 222 is too long). Accordingly, the NER system 130 may be configured to segment the first document 222 into the plurality of segmented documents 234 based at least in part on a vulnerability ID.

At operation 626, the process may include identifying the given document as a discrete document chunk without segmenting the given document. For example, referring to FIG. 2, at decision box 232, a determination may be made that the second document 224 does not satisfy the at least one segmentation condition (e.g., the second document 224 is not too long). In this case, the second document 224 may be identified as a discrete document chunk and stored at the vulnerability document database 140 without segmenting the second document 224.

At operation 630, the process includes storing the set of discrete document chunks in a database. Vulnerability information contained within the set of discrete document chunks is indexed such that each respective entry in the database corresponds to a respective vulnerability ID and a respective discrete document chunk of the set of discrete document chunks. For example, referring to FIG. 2, the NER system 130 may be configured to store the plurality of segmented documents 234 (associated with the first document 222) at the vulnerability document database 140. Vulnerability information contained within the plurality of segmented documents 234 may be indexed such that each respective entry in the vulnerability document database 140 corresponds to a respective vulnerability ID and a respective discrete segmented document of the plurality of segmented documents 234.

Thus, FIG. 6 illustrates an example of processing of web content for vulnerability assessments.

Figure 7:
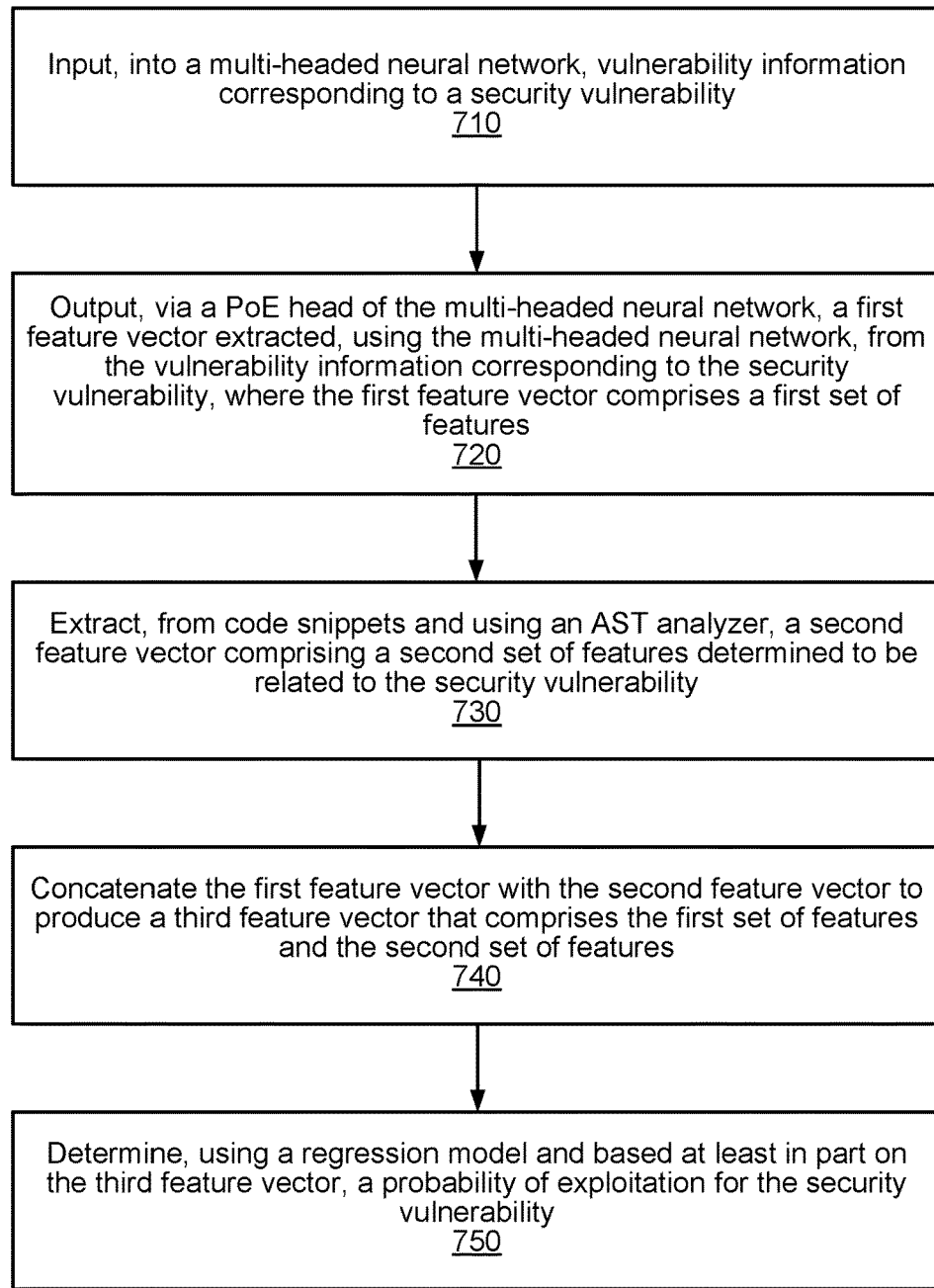
FIG. 7 is a flowchart that illustrates an example process for determining expected exploitability of security vulnerabilities, according to some embodiments.

FIG. 7 is a flowchart 700 that illustrates an example of a process for determining expected exploitability of security vulnerabilities, according to some embodiments. In FIG. 7, one or more hardware processors may be utilized to implement the operations described.

At operation 710, the process includes inputting, into a multi-headed neural network, vulnerability information corresponding to a security vulnerability. For example, referring to FIG. 2, the neural network 150 may correspond to a multi-headed neural network (having a first head identified as a QA head and having a second head identified as a PoE head). FIG. 2 illustrates that vulnerability information (corresponding to a security vulnerability) may be provided to the neural network 150 from the vulnerability document database 140.

At operation 720, the process includes outputting, via a PoE head of the multi-headed neural network, a first feature vector. The first feature vector is extracted, using the multi-headed neural network, from the vulnerability information corresponding to the security vulnerability, where the first feature vector comprises a first set of features. For example, referring to FIG. 2, the PoE head of the neural network 150 may output the first feature vector 252. The first feature vector 252 may be extracted, using the neural network 150, from the vulnerability information corresponding to the security vulnerability, and the first feature vector 252 may include a first set of features.

At operation 730, the process includes extracting, from code snippets and using an AST analyzer, a second feature vector comprising a second set of features determined to be related to the security vulnerability. For example, referring to FIG. 2, the second feature vector 262 may be extracted from the code 132 and using the code analyzer 160 (e.g., an AST analyzer). The second feature vector 262 may include a second set of features determined to be related to the security vulnerability.

At operation 740, the process includes concatenating the first feature vector with the second feature vector to produce a third feature vector that comprises the first set of features and the second set of features. For example, referring to FIG. 2, the first feature vector 252 (from the PoE head of the neural network 150) and the second feature vector 262 (from the code analyzer 160) may be concatenated together to produce a third feature vector as an input to the PoE system 170. The third feature vector may include the first set of features (from the first feature vector 252) and the second set of features (from the second feature vector 262).

At operation 750, the process includes determining, using a regression model and based at least in part on the third feature vector, a probability of exploitation for the security vulnerability. For example, referring to FIG. 2, the PoE system 170 may determine, using a regression model and based at least in part on the concatenated feature vector, the expected exploitability 272 (which may represent a probability of exploitation for a particular security vulnerability).

Thus, FIG. 7 illustrates an example of a process for determining expected exploitability of security vulnerabilities.

Figure 8:
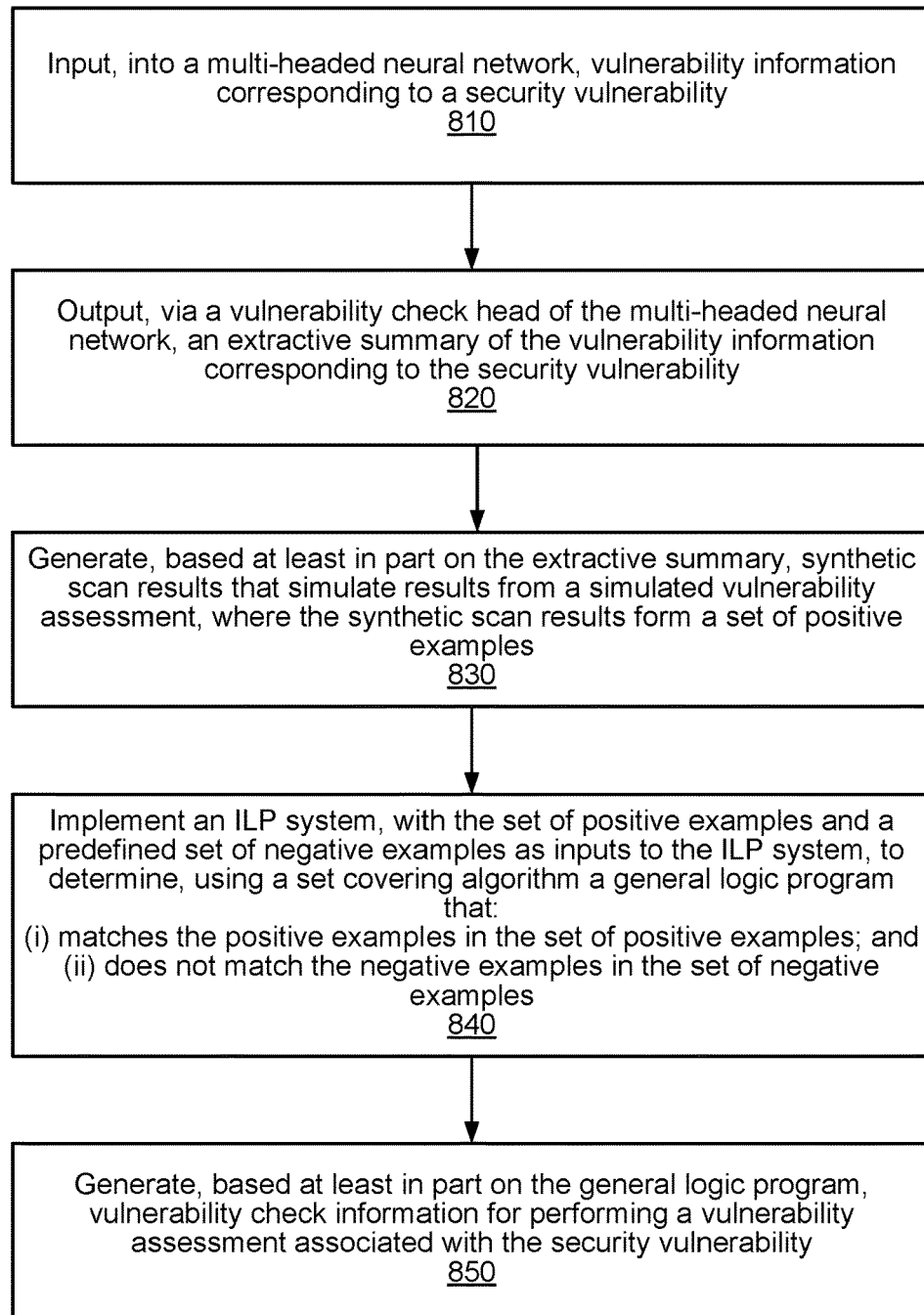
FIG. 8 is a flowchart that illustrates an example process for generating vulnerability check information for performing vulnerability assessments associated with security vulnerabilities, according to some embodiments.

FIG. 8 is a flowchart 800 that illustrates an example of a process for generating vulnerability check information for performing vulnerability assessments associated with security vulnerabilities, according to some embodiments. In FIG. 8, one or more hardware processors may be utilized to implement the operations described.

At operation 810, the process includes inputting, into a multi-headed neural network, vulnerability information corresponding to a security vulnerability. For example, referring to FIG. 2, the neural network 150 may correspond to a multi-headed neural network (having a first head identified as a QA head and having a second head identified as a PoE head). FIG. 2 illustrates that vulnerability information (corresponding to a security vulnerability) may be provided to the neural network 150 from the vulnerability document database 140.

At operation 820, the process includes outputting, via a vulnerability check head of the multi-headed neural network, an extractive summary of the vulnerability information corresponding to the security vulnerability. For example, referring to FIG. 2, the QA head of the neural network 150 may output the extractive summary of the vulnerability information corresponding to the security vulnerability.

At operation 830, the process includes generating, based at least in part on the extractive summary, synthetic scan results that simulate results from a simulated vulnerability assessment, where the synthetic scan results form a set of positive examples. For example, referring to FIG. 2, the synthetic example generator 282 may be configured to generate synthetic scan results based at least in part on the extractive summary 254. As described herein with respect to FIG. 2, the synthetic scan results may simulate results from a simulated vulnerability assessment, where the synthetic scan results form a set of positive examples.

At operation 840, the process includes implementing an ILP system, with the set of positive examples and a predefined set of negative examples as inputs to the ILP system, to determine, using a set covering algorithm, a general logic program. The general logic program: (i) matches the positive examples in the set of positive examples; and (ii) does not match the negative examples in the set of negative examples. For example, referring to FIG. 2, the ILP system 180 may be implemented with the set of positive examples (from the synthetic example generator 282) and a predefined set of negative examples as inputs to the ILP system 180. The ILP system 180 may be configured to determine, using a set covering algorithm, a general logic program. For example, as described herein with respect to FIG. 2, the ILP system 180 may be configured to generate a general logic program that matches the positive examples but does not match the negative examples.

At operation 850, the process includes generating, based at least in part on the general logic program, vulnerability check information for performing a vulnerability assessment associated with the security vulnerability. For example, referring to FIG. 2, the ILP system 180 may generate the candidate vulnerability check file 286 based at least in part on the general logic program. The candidate vulnerability check file 286 may include vulnerability check information for performing a vulnerability assessment associated with a particular security vulnerability. According to some embodiments, as depicted in FIG. 2, the validator 290 may be configured to perform syntactical operations on the candidate vulnerability check file 286 to output the vulnerability check file 292.

Thus, FIG. 8 illustrates an example of a process of for generating vulnerability check information for performing vulnerability assessments associated with security vulnerabilities.

Figure 9:
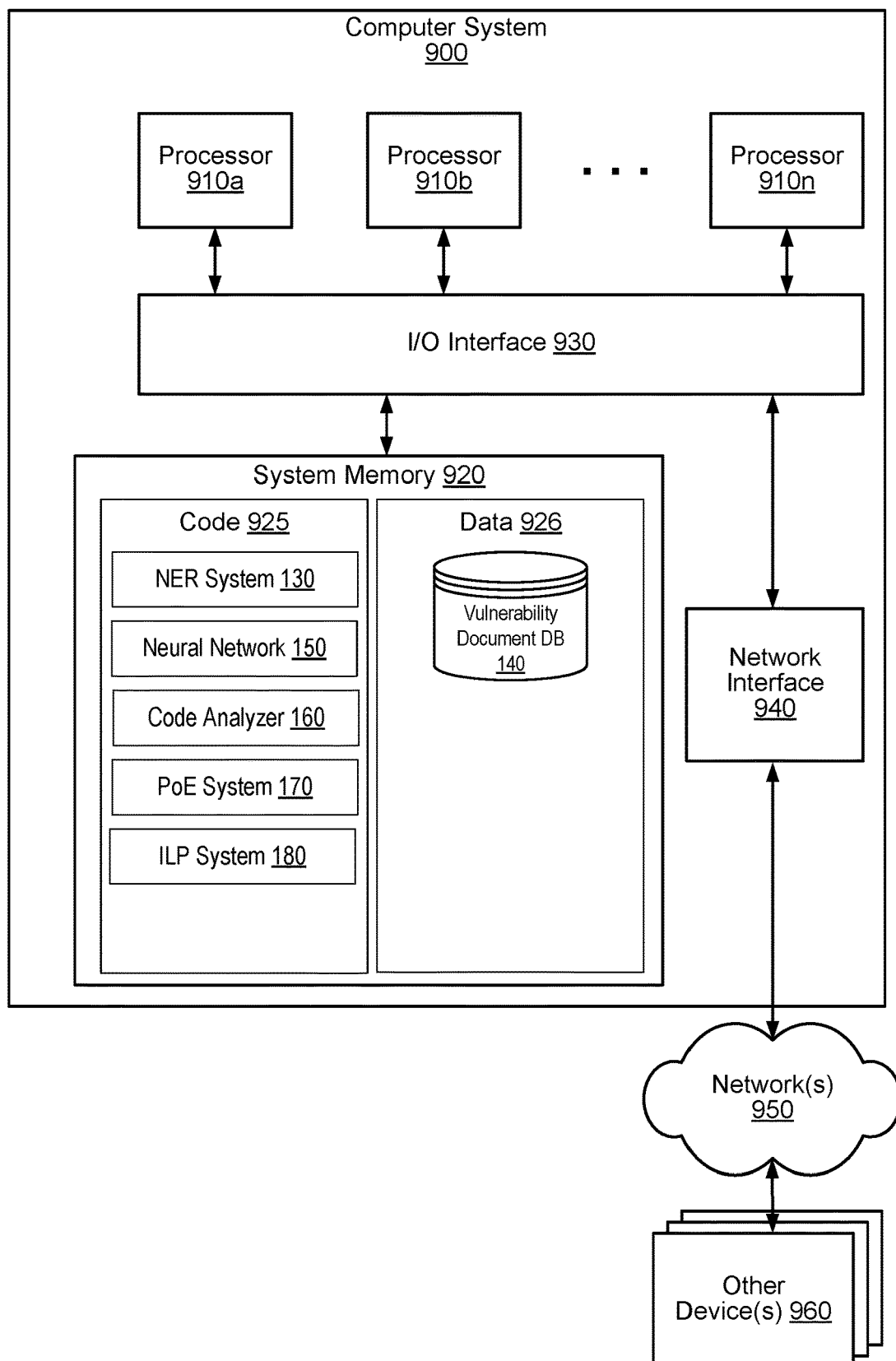
FIG. 9 is a block diagram illustrating an example computer system that may be used to implement one or more portions of a system that implements operations according to various embodiments of the present disclosure.

FIG. 9 is a block diagram illustrating an example computer system 900 that is used to implement one or more portions of a system that implements operations according to various embodiments of the present disclosure. For example, the computer system 900 may be a server that implements one or more components of the systems 100, 200 depicted in FIG. 1 and FIG. 2, respectively.

Computer system 900 may be implemented using a variety of computing devices, such as a personal computer system, desktop computer, laptop or notebook computer, mainframe computer system, handheld computer, workstation, network computer, a consumer device, application server, mobile telephone, or some other type of computing device.

As shown, computer system 900 includes one or more processors 910, which may include multiple cores coupled to a system memory 920 via an input/output (I/O) interface 930. Computer system 900 further includes a network interface 940 coupled to I/O interface 930. In some embodiments, computer system 900 may be a uniprocessor system including one processor 910, or a multiprocessor system including several processors 910a-n, as shown. The processors 910 may be any suitable processors capable of executing instructions. For example, in various embodiments, processors 910 may implement one of a number of instruction set architectures (ISAs), such as the x86, PowerPC, SPARC, or MIPS ISA.

As shown, the computer system 900 may also include one or more network communication devices (e.g., network interface 940) for communicating with other systems and/or components over a communications network. For example, an instance of an application executing on computer system 900 may use network interface 940 to communicate with another server application executing on another computer system, as described herein.

As shown, computer system 900 may use its network interface 940 to communicate with one or more other devices 960, such as persistent storage devices and/or one or more I/O devices. In some embodiments, some of these other devices may be implemented locally on the computer system 900, accessible via the I/O interface 930. In various embodiments, persistent storage devices may include disk drives, tape drives, solid state memory, other mass storage devices, or any other persistent storage device. The computer system 900 may store instructions and/or data in persistent storage devices, and retrieve the stored instruction and/or data as needed.

As shown, the computer system 900 may include one or more system memories 920 that store instructions and data accessible by processor(s) 910. In various embodiments, system memories 920 may be implemented using any suitable memory technology, (e.g., one or more of cache, static random-access memory (SRAM), DRAM, RDRAM, EDO RAM, DDR 10 RAM, synchronous dynamic RAM (SDRAM), EEPROM, non-volatile/Flash-type memory, etc.). The system memory 920 may be used to store code 925 or executable instructions to implement the methods and techniques described herein. For example, the executable instructions may include instructions to implement the NER system 130, the neural network 150, the code analyzer 160, the PoE system 170, and the ILP system 180, as discussed. The system memory 920 may also be used to store data 926 needed or produced by the executable instructions. For example, the in-memory data 926 may include portions of the vulnerability document database 140, as discussed.

In some embodiments, some of the code 925 or executable instructions may be persistently stored on the computer system 900 and may have been loaded from external storage media. The persistent storage of the computer system 900 and the external media are examples of non-transitory computer-readable storage media, which may be used to store program instructions to be executed by the computer system 900. A non-transitory computer-readable storage medium may provide the capability to store information in a form readable by a machine (e.g., computer system 900). Non-transitory computer-readable media may include storage media such as magnetic or optical media, disk or DVD/CD-ROM devices, archival tapes, network-attached storage systems, or other computer systems.

In some embodiments, the I/O interface 930 may be configured to coordinate I/O traffic between processor 910, system memory 920 and any peripheral devices in the system, including through network interface 940 or other peripheral interfaces. In some embodiments, I/O interface 930 may perform any necessary protocol, timing or other data transformations to convert data signals from one component (e.g., system memory 920) into a format suitable for use by another component (e.g., processor 910). In some embodiments, I/O interface 930 may include support for devices attached through various types of peripheral buses, such as a variant of the Peripheral Component Interconnect (PCI) bus standard or the Universal Serial Bus (USB) standard, for example. In some embodiments, the function of I/O interface 930 may be split into two or more separate components, such as a north bridge and a south bridge, for example. Also, in some embodiments, some or all of the functionality of I/O interface 930, such as an interface to system memory 920, may be incorporated directly into processor 910.

In some embodiments, the network interface 940 may allow data to be exchanged between computer system 900 and other devices attached to a network. The network interface 940 may also allow communication between computer system 900 and various I/O devices and/or remote storage systems. Input/output devices may, in some embodiments, include one or more display terminals, keyboards, keypads, touchpads, scanning devices, voice or optical recognition devices, or any other devices suitable for entering or retrieving data by one or more computer systems. Multiple input/output devices may be present in computer system 900 or may be distributed on various nodes of a distributed system that includes computer system 900. In some embodiments, similar input/output devices may be separate from computer system 900 and may interact with one or more nodes of a distributed system that includes computer system 900 through a wired or wireless connection, such as over network interface 940. Network interface 940 may commonly support one or more wireless networking protocols (e.g., Wi-Fi/IEEE 802.11, or another wireless networking standard). In some embodiments, the network interface 940 may support communication via telecommunications/telephony networks such as analog voice networks or digital fiber communications networks, via storage area networks such as Fibre Channel SANs, or via any other suitable type of network and/or protocol.

Various modifications and changes may be made as would be obvious to a person skilled in the art having the benefit of this disclosure. The various embodiments described herein are meant to be illustrative and not limiting. Many variations, modifications, additions, and improvements are possible. These and other variations, modifications, additions, and improvements may fall within the scope of embodiments as defined in the claims that follow.

What is claimed is:

1. A system, comprising:
one or more hardware processors with associated memory that implement a process for generating vulnerability check information for performing vulnerability assessments associated with security vulnerabilities, wherein the one or more hardware processors are configured to:
input, into a multi-headed neural network, vulnerability information corresponding to a security vulnerability;
output, via a vulnerability check head of the multi-headed neural network, an extractive summary of the vulnerability information corresponding to the security vulnerability;
generate, based at least in part on the extractive summary, synthetic scan results that simulate results from a simulated vulnerability assessment, wherein the synthetic scan results form a set of positive examples;
implement an inductive logic programming (ILP) system, with the set of positive examples and a set of predefined negative examples as inputs to the ILP system, to determine, using a set covering algorithm, a general logic program that: (i) matches the positive examples in the set of positive examples, and (ii) does not match the negative examples in the predefined set of negative examples; and
generate, based at least in part on the general logic program, vulnerability check information for performing a vulnerability assessment associated with the security vulnerability.

2. The system of claim 1, wherein the one or more hardware processors are further configured to:
generate, based at least in part on the general logic program, a candidate vulnerability check associated with the security vulnerability; and
validate the candidate vulnerability check, wherein, responsive to determining that the candidate vulnerability check is valid, the one or more hardware processors are configured to generate a valid vulnerability check file for performing the vulnerability assessment associated with the security vulnerability.

3. The system of claim 2, wherein:
the candidate vulnerability check is a first candidate vulnerability check; and
responsive to determining that the first candidate vulnerability check is invalid, the one or more hardware processors are configured to:
generate, based at least in part on the general logic program, a second candidate vulnerability check; and
validate the second candidate vulnerability check.

4. The system of claim 1, wherein, to output the extractive summary, the one or more hardware processors are configured to:
perform a question answering task to extract, from the vulnerability information, a subset of information based on a defined structure for the extractive summary.

5. The system of claim 4, wherein the one or more hardware processors are further configured to:
generate, using a converter and based at least in part on the extractive summary, at least one of:
a content file; or
a solution file.

6. The system of claim 1, wherein the one or more hardware processors are further configured to:
store a set of discrete document chunks in a database, wherein vulnerability information contained within the set of discrete document chunks is indexed such that each respective entry in the database corresponds to a respective vulnerability identification (ID) and a respective discrete chunk of the set of discrete document chunks.

7. The system of claim 6, wherein the vulnerability information corresponding to the security information comprises information obtained from at least a portion of the set of discrete document chunks in the database.

8. The system of claim 6, wherein:
the multi-headed neural network is configured to:
utilize a tokenizer to tokenize the set of discrete document chunks, wherein the tokenizer is configured to recognize at least one of vocabulary-related vocabulary or exploit-related vocabulary;
for each respective vulnerability ID:
collect each corresponding discrete document chunk from the set of discrete document chunks, wherein each corresponding discrete document chunk corresponds to the respective vulnerability ID; and
responsive to collecting multiple corresponding discrete document chunks, concatenate the multiple corresponding discrete document chunks together.

9. The system of claim 1, wherein:
the multi-headed neural network further comprises a probability of exploitation (PoE) head; and
the one or more hardware processors are further configured to:
output, via the PoE head, a feature vector extracted, using the multi-headed neural network, from the vulnerability information corresponding to the security vulnerability, wherein the first feature vector comprises a set of features.

10. The system of claim 9, wherein:
the feature vector is a first feature vector, and the set of features is a first set of features; and
the one or more hardware processors are further configured to:
extract, from code snippets and using an abstract syntax tree (AST) analyzer, a second feature vector comprising a second set of features determined to be related to the security vulnerability;
concatenate the first feature vector with the second feature vector to produce a third feature vector that comprises the first set of features and the second set of features; and
determine, using a regression model and based at least in part on the third feature vector, a probability of exploitation for the security vulnerability.

11. A method comprising:
implementing, using one or more hardware processors, a process for generating vulnerability check information for performing vulnerability assessments associated with security vulnerabilities, wherein the implementing comprises:
inputting, into a multi-headed neural network, vulnerability information corresponding to a security vulnerability;
outputting, via a vulnerability check head of the multi-headed neural network, an extractive summary of the vulnerability information corresponding to the security vulnerability;

generating, based at least in part on the extractive summary, synthetic scan results that simulate results from a simulated vulnerability assessment, wherein the synthetic scan results form a set of positive examples;

implementing an inductive logic programming (ILP) system, with the set of positive examples and a set of predefined negative examples as inputs to the ILP system, to determine, using a set covering algorithm, a general logic program that: (i) matches the positive examples in the set of positive examples, and (ii) does not match the negative examples in the predefined set of negative examples; and generating, based at least in part on the general logic program, vulnerability check information for performing a vulnerability assessment associated with the security vulnerability.

12. The method of claim 11, wherein the implementing further comprises:

generating, based at least in part on the general logic program, a candidate vulnerability check associated with the security vulnerability; and validating the candidate vulnerability check, wherein, responsive to determining that the candidate vulnerability check is valid, the one or more hardware processors are configured to generate a valid vulnerability check file for performing the vulnerability assessment associated with the security vulnerability.

13. The method of claim 12, wherein:

the candidate vulnerability check is a first candidate vulnerability check; and responsive to determining that the first candidate vulnerability check is invalid, the implementing comprises:

generating, based at least in part on the general logic program, a second candidate vulnerability check; and validating the second candidate vulnerability check.

14. The method of claim 11, wherein to output the extractive summary, the implementing comprises:

performing a question answering task to extract, from the vulnerability information, a subset of information based on a defined structure for the extractive summary.

15. One or more non-transitory computer-accessible storage media storing program instructions that, when executed on or across one or more hardware processors, implement at least a portion of a system that implements a process for generating vulnerability check information for performing vulnerability assessments associated with security vulnerabilities and cause the system to:

input, into a multi-headed neural network, vulnerability information corresponding to a security vulnerability;

output, via a vulnerability check head of the multi-headed neural network, an extractive summary of the vulnerability information corresponding to the security vulnerability;

generate, based at least in part on the extractive summary, synthetic scan results that simulate results from a simulated vulnerability assessment, wherein the synthetic scan results form a set of positive examples;

implement an inductive logic programming (ILP) system, with the set of positive examples and a set of predefined negative examples as inputs to the ILP system, to determine, using a set covering algorithm, a general logic program that: (i) matches the positive examples in the set of positive examples, and (ii) does not match the negative examples in the predefined set of negative examples; and generate, based at least in part on the general logic program, vulnerability check information for performing a vulnerability assessment associated with the security vulnerability.

16. The one or more non-transitory computer-accessible storage media of claim 15, wherein the program instructions when executed on or across the one or more hardware processors cause the system to:

store a set of discrete document chunks in a database, wherein vulnerability information contained within the set of discrete document chunks is indexed such that each respective entry in the database corresponds to a respective vulnerability identification (ID) and a respective discrete chunk of the set of discrete document chunks.

17. The one or more non-transitory computer-accessible storage media of claim 16, wherein the vulnerability information corresponding to the security information comprises information obtained from at least a portion of the set of discrete document chunks in the database.

18. The one or more non-transitory computer-accessible storage media of claim 16, wherein:

the multi-headed neural network is configured to:

utilize a tokenizer to tokenize the set of discrete document chunks, wherein the tokenizer is configured to recognize at least one of vocabulary-related vocabulary or exploit-related vocabulary;

for each respective vulnerability ID:

collect each corresponding discrete document chunk from the set of discrete document chunks, wherein each corresponding discrete document chunk corresponds to the respective vulnerability ID; and responsive to collecting multiple corresponding discrete document chunks, concatenate the multiple corresponding discrete document chunks together.

19. The one or more non-transitory computer-accessible storage media of claim 15, wherein:

the multi-headed neural network further comprises a probability of exploitation (PoE) head; and the one or more hardware processors are further configured to:

output, via the PoE head, a feature vector extracted, using the multi-headed neural network, from the vulnerability information corresponding to the security vulnerability, wherein the first feature vector comprises a set of features.

20. The one or more non-transitory computer-accessible storage media of claim 19, wherein:

the feature vector is a first feature vector, and the set of features is a first set of features; and the program instructions when executed on or across the one or more hardware processors further cause the system to:

extract, from code snippets and using an abstract syntax tree (AST) analyzer, a second feature vector comprising a second set of features determined to be related to the security vulnerability;

concatenate the first feature vector with the second feature vector to produce a third feature vector that comprises the first set of features and the second set of features; and determine, using a regression model and based at least in part on the third feature vector, a probability of exploitation for the security vulnerability.

* * * * *